US011084353B2

(12) United States Patent
Dearth et al.

(10) Patent No.: US 11,084,353 B2
(45) Date of Patent: Aug. 10, 2021

(54) CABIN PURGE FOR VEHICLE VENTILATING AND COOLING SYSTEM

(71) Applicant: Ford Global Technologies, LLC, Dearborn, MI (US)

(72) Inventors: Mark Allen Dearth, Dearborn, MI (US); Paul Bryan Hoke, Plymouth, MI (US); Lawrence C. Karas, New Boston, MI (US); Eric Gerd Schaefer, Farmington Hills, MI (US); Timothy James Hallifax, Toorak (AU); Rainer Vogt, Aachen (DE); Volker Scheer, Roetgen (DE); Timothy John Wallington, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 687 days.

(21) Appl. No.: 15/471,773

(22) Filed: Mar. 28, 2017

(65) Prior Publication Data
US 2018/0281560 A1    Oct. 4, 2018

(51) Int. Cl.
*B60H 1/00*          (2006.01)
(52) U.S. Cl.
CPC ....... *B60H 1/00821* (2013.01); *B60H 1/0075* (2013.01); *B60H 1/00742* (2013.01); *B60H 1/00778* (2013.01); *B60H 1/00978* (2013.01); *B60Y 2400/306* (2013.01); *B60Y 2400/3086* (2013.01)

(58) Field of Classification Search
CPC ............ B60H 1/00821; B60H 1/00742; B60H 1/00735; B60H 1/0075; B60Y 2400/306; B60Y 2400/3086
See application file for complete search history.

(56) References Cited

U.S. PATENT DOCUMENTS

| 4,107,941 A | * | 8/1978 | Hamilton | F24F 11/00 236/1 R |
| 4,852,469 A | * | 8/1989 | Chuang | B60H 1/00785 454/75 |
| 5,054,686 A | * | 10/1991 | Chuang | B60H 1/00735 236/1 R |
| 5,222,661 A | * | 6/1993 | Wenhart | B60H 1/00735 236/49.3 |

(Continued)

FOREIGN PATENT DOCUMENTS

DE    102009053649 A1    6/2010
JP    2004306780 A    * 11/2004

OTHER PUBLICATIONS

Auto Service World, Sunload Sensors Explained, Apr. 1, 2009; pp. 1-2, https://www.autoserviceworld.com/jobbernews/sunload-sensors-explained/ (Year: 2009).*

*Primary Examiner* — Ramsey Refai
(74) *Attorney, Agent, or Firm* — David Coppiellie; Brooks Kushman, P.C.

(57) ABSTRACT

A vehicle ventilating/cooling system may include at least one sun-load sensor arranged within the vehicle, and a controller configured to receive a sun-load signal indicating a sun-load level from the sensor and programmed to instruct at least one cooling component to conduct a purge of vehicle cabin air in response to the sun-load level exceeding a sun-load threshold.

8 Claims, 3 Drawing Sheets

(56) References Cited

U.S. PATENT DOCUMENTS

| | | | | |
|---|---|---|---|---|
| 5,261,596 | A | * | 11/1993 | Tachibana ................ F24F 11/30 236/49.3 |
| 5,427,313 | A | * | 6/1995 | Davis, Jr. ........... B60H 1/00814 236/49.3 |
| 5,509,852 | A | * | 4/1996 | Clark ................ B60H 1/00735 454/141 |
| 5,518,176 | A | * | 5/1996 | Turner ............... B60H 1/00742 236/49.3 |
| 5,547,125 | A | * | 8/1996 | Hennessee ......... B60H 1/00735 236/49.3 |
| 5,579,994 | A | * | 12/1996 | Davis, Jr. ........... B60H 1/00735 236/49.3 |
| 6,052,998 | A | * | 4/2000 | Dage ................ B60H 1/00735 62/178 |
| 6,345,767 | B1 | * | 2/2002 | Burrus, IV ......... B60H 1/00735 236/1 R |
| 6,693,535 | B2 | * | 2/2004 | Van Bosch ......... B60R 25/1004 307/10.2 |
| 8,672,022 | B2 | | 3/2014 | Ostermeier et al. |
| 2002/0161501 | A1 | * | 10/2002 | Dulin .................... B06B 1/0215 701/45 |
| 2003/0121988 | A1 | * | 7/2003 | Rutyna .................. B60H 1/248 236/49.3 |
| 2006/0033613 | A1 | * | 2/2006 | Reece ...................... B60Q 1/52 340/457 |
| 2010/0236770 | A1 | * | 9/2010 | Pursifull ............ B60H 1/00764 165/202 |
| 2014/0157802 | A1 | * | 6/2014 | Pebley ............... B60H 1/00457 62/89 |
| 2014/0229059 | A1 | * | 8/2014 | Surnilla ............. B60H 1/00742 701/36 |
| 2015/0343882 | A1 | | 12/2015 | Satzger et al. |

* cited by examiner

CABIN PURGE FOR VEHICLE VENTILATING AND COOLING SYSTEM

TECHNICAL FIELD

Disclosed herein are cabin purge for vehicle ventilating and cooling systems.

BACKGROUND

Vehicle ventilating and cooling systems may be configured to purge air within the vehicle cabin in order to reduce the air temperature within the cabin, as well as to reduce the residual smell of volatile organic chemicals (VOC).

SUMMARY

A vehicle ventilating/cooling system may include at least one sun-load sensor arranged within the vehicle, and a controller configured to receive a sun-load signal indicating a sun-load level from the sensor and programmed to instruct at least one ventilating/cooling component to conduct a purge of vehicle cabin air in response to the sun-load level exceeding a sun-load threshold.

A method may include receiving seat sensor data or occupant detection data indicative of at least one vehicle occupant, receiving a vehicle engine status, and instructing at least one ventilating/cooling component to purge the vehicle cabin air in response to the vehicle status indicating that the vehicle has been inactive for a threshold amount of time.

A vehicle ventilating/cooling system may include at least one seat sensor arranged within the vehicle for detecting an item on a vehicle seat, and a controller configured to receive seat sensor data indicating occupancy of the vehicle from the sensor, the controller programmed to instruct at least one ventilating/cooling component to conduct a purge of the vehicle cabin air in response to the seat sensor indicating occupancy of the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle ventilating and cooling system is disclosed herein that is configured to purge vehicle cabin air when the vehicle is inactive, or not running (e.g., the engine is off). The purges may be scheduled using a remote device such as a mobile phone. The mobile device may include an interface such as AppLink that allows a user to preselect or remotely command a one-minute purge of the cabin air via an HVAC fan. These purges may be permitted so long as a battery state of charge is sufficient to allow the HVAC fan to operate at up to a full fan power setting.

The system may prevent purging in the event that the battery state of charge is not sufficient. Furthermore, interior and exterior temperatures, the status of windows, occupant presence, and other aspect of the vehicle state such as engine status, sun-load, etc., may affect the permissibility of purging.

Figure 1:
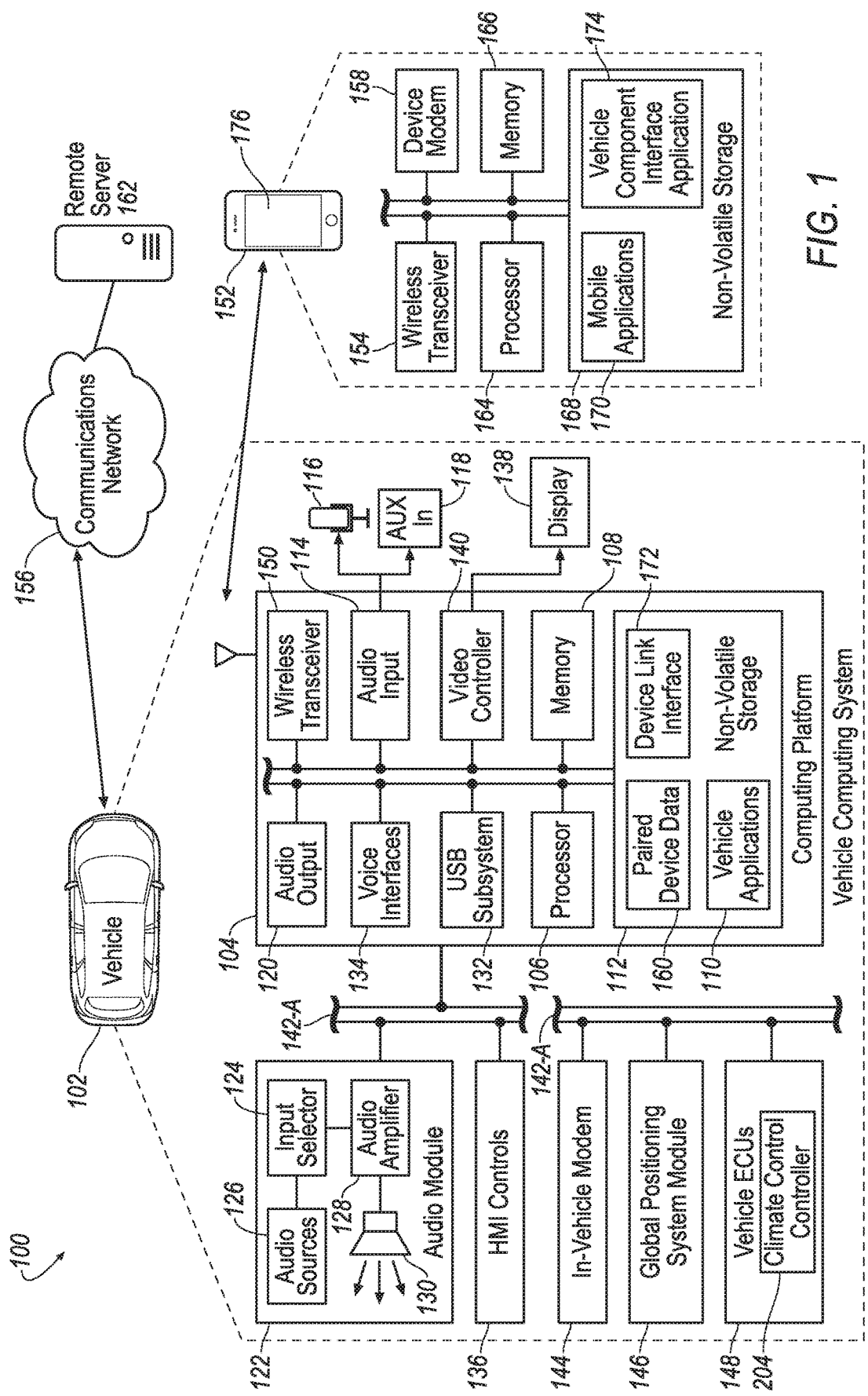
FIG. 1 illustrates an example system diagram for an information display system.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e.g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an in-vehicle modem 144 (which may not be present in some configurations), a global positioning system (GPS) module 146 configured to provide current vehicle 102 location and heading information, and various vehicle ECUs 148 configured to provide other types of information regarding the systems of the vehicle 102.

Figure 2:
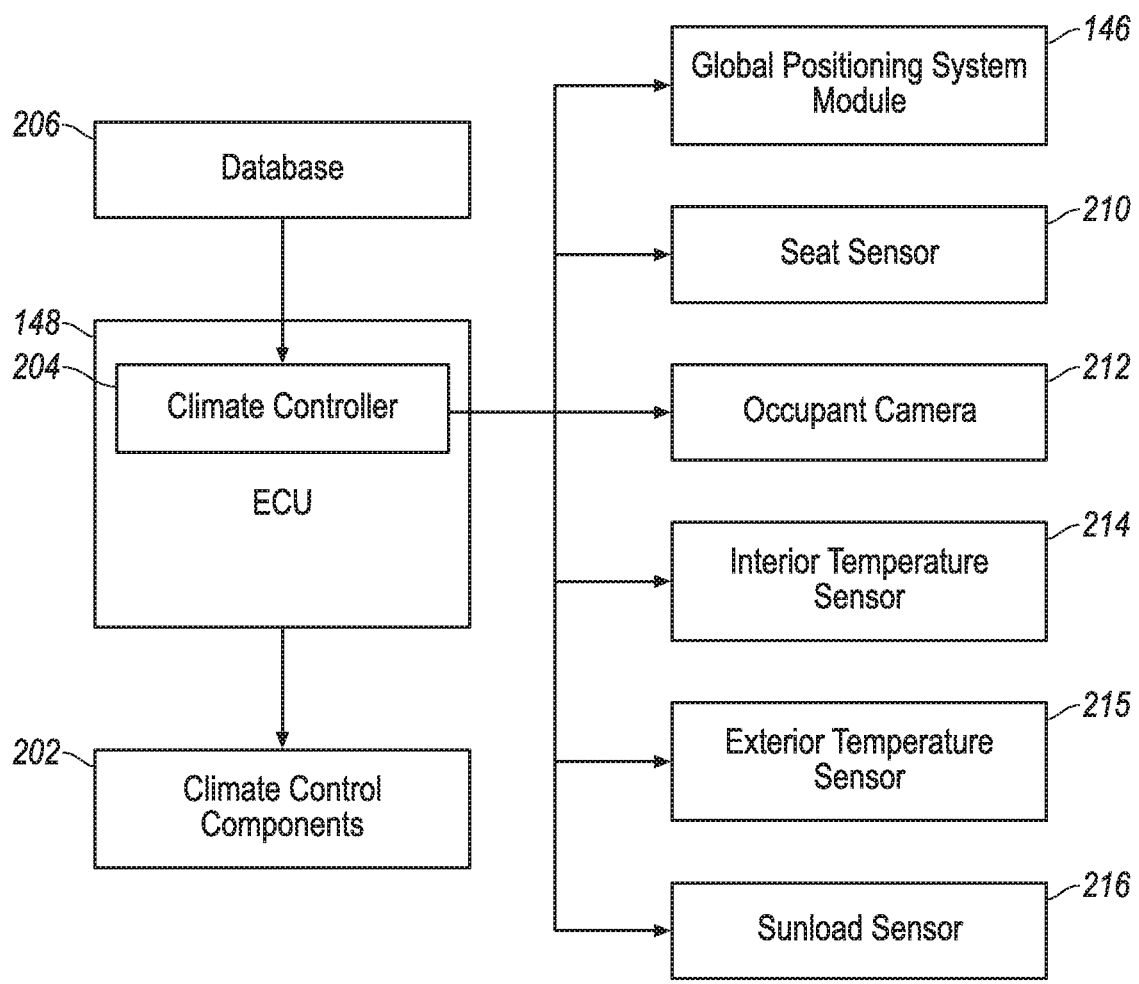
FIG. 2 illustrates an example diagram for a vehicle ventilating and cooling system.

For example, the ECUs 148 may include a climate controller 204 configured to control a vehicle ventilating and cooling system 200 (shown in FIG. 2). The climate controller 204 may be programmed to maintain a comfortable cabin temperature for the driver and vehicle occupants. The climate controller 204 may receive temperature data from various sensors and provide instructions to control various blowers and other ventilating and cooling components to provide a desired level of cooling to the interior vehicle cabin. The climate controller 204 is described in more detail with respect to FIG. 2.

As some other non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142, and the vehicle modem 144, GPS module 146, and vehicle ECUs 148 may communicate with the computing platform 104 over a second in-vehicle network 142. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., media access control (MAC) addresses, mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112.

The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional or options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

FIG. 2 illustrates an example diagram for a vehicle ventilating and cooling system 200. The vehicle ventilating and cooling system 200 may be configured to control climate control components 202 to cool the vehicle cabin to ensure the comfort of the driver and other occupants. The climate control components 202 may include blowers, vents, temperature sensors, compressors, evaporators, chillers, vehicle windows, and any other component used to provide cool air.

The vehicle ventilating and cooling system 200 may include the climate controller 204. As explained above with respect to FIG. 1, the climate controller 204 may be part of the ECU 148 and may be programmed to provide instructions to the climate control components 202.

The climate controller 204 may be in communication with a database 206. The database 206 may maintain vehicle climate data such as a time since last purge, etc. The database 206 may be included in the storage 112 as described above with respect to FIG. 1.

The vehicle ventilating and cooling system 200 may also include the GPS module 146 as explained above with respect to FIG. 1. The system 200 may include various sensors and components configured to provide purge data to the climate controller 204. This purge data may be used by the climate controller 204 to determine whether a purge event has occurred or whether vehicle conditions are appropriate and desirable for purging. These sensors may include a seat sensor 210, an occupant camera 212, temperature sensors 214, 215 and a sun-load sensor 216, for example.

The seat sensor 210 may include at least one sensor configured to detect whether a vehicle seat is occupied. That is, whether a person is seated in a respective seat. The seat sensor 210 may provide occupancy data or status to the controller 204. The seat sensor data may indicate if a person is positions within the vehicle and which seat the person is sitting. The climate controller 204 may compare the received seat sensor data to a predetermined threshold in order to differentiate between an item being placed on the vehicle seat and a person sitting thereon. Such thresholds may include a weight threshold such as 80 lbs., for example.

The seat sensor 210 may be a pressure sensor configured to recognize if a seat is depressed, therefore indicating the presence of a person on that seat. Such pressure sensors may include capacitive, electromagnetic, thermal, optical, etc. The climate controller 204 may differentiate between an object that is below a weight threshold and a person. Further, the climate controller 204 may differentiate between an adult and a child. For example, if the seat sensor 210 detects an item that is approximately 10 lbs., the controller 204 may recognize the item as an object. If the controller 204 recognizes a weight of over 10 lbs., but less than 80 lbs., then the controller 204 may determine that the occupant is a child. Thus, a child threshold range may be recognized by the controller 204.

The occupant camera 212 may include an in-vehicle camera configured to detect one or both of sun-load and user presence. In the first example, the camera 212 may be configured to capture images of the vehicle. These images may be still images or a sequence of images. The images may indicate whether a person is in a vehicle seat. The camera 212 may transmit these images to climate controller 204. The climate controller 204 may then determine whether the image indicates that a user is occupying a certain seat. The controller 204 may be configured to differentiate between several seat locations. The camera 212 may be activated or turned on in response to a command from the climate controller 204.

In addition to or in the alternative to the occupant camera 212, other occupant detect systems could be included. For example, an optical sensor, ultrasonic sensor or sound sensor (e.g., audio detection via a microphone) may detect occupant presence. Any number of mechanism may be implemented to detect occupant presence. Such occupancy data may be transmitted to the climate controller 204, similar to the images being transmitted. The climate controller 204 may then determine whether the data indicates the presence of a person in the vehicle.

The camera 212 may also detect sun-load and transmit a sun-load level. The camera 212 may capture the amount of sunlight entering the vehicle. The amount of sunlight may correspond to the sun-load level transmitted to the climate controller 204. The higher amount of sunlight, the higher the sun-load. The higher the sun-load, the more likely the vehicle cabin is to be heated by the sunlight. The vehicle ventilating and cooling system 200 may also include a sun-load sensor 216 configured to detect the sun-load level. The sun-load sensor 216 may be arranged on a vehicle dash board, vehicle vent, or other position within the vehicle that is exposed to sunlight. The sun-load sensor 216 may be a photodiode sensor whereby the resistance increases as the light intensity increases. Thus, the signal, or voltage, from the sensor decreases as the light intensity increases. The sun-load sensor 216 may provide a voltage signal to the climate controller 204, which may in turn determine the sun-load level based on the received voltage indicated by the voltage signal.

The temperature sensors 214, 215 may be configured to detect ambient air temperature and may include electrical temperature sensors such as thermistors, resistance thermometers, as well as mechanical temperature sensors such as a thermometer. The interior temperature sensor 214 may detect an interior temperature, or temperature within the vehicle cabin. The exterior temperature sensor 215 may detect an exterior temperature, or temperature outside of the vehicle.

The climate controller 204 may receive the interior and exterior temperatures from the temperature sensors 214, 215 and may determine whether one or both temperatures exceed a respective threshold. Such thresholds may be indicative that the vehicle cabin may be too warm for comfort. For example, an interior temperature threshold may be approximately 100 degrees Fahrenheit. An exterior temperature threshold may be approximately 80 degrees Fahrenheit. If the temperature exceeds one or both thresholds, the climate controller 204 may instruct the ventilating and cooling system 200 to purge the vehicle cabin.

The climate controller 204 may receive the various signals and data from the sensors making up the purge data. Based on the purge data, the controller 204 may determine whether a cabin purge is appropriate to the extent that a purge would aid in ventilating and cooling the vehicle cabin and reducing smells caused by VOCs. In addition to the purge data explicitly set forth above, the purge data may include other data from the various ECUs 148 and vehicle systems described herein. For example, the purge data may include a battery state of charge (SOC), and a vehicle state such as whether the vehicle is in park, drive, reverse, neutral, etc., and the duration that the vehicle has been in that state. The vehicle state may be received from the ECU 148, or other vehicle module or controller. The database 206 may maintain the vehicle engine status as well as a length of time at that status (e.g., the amount of time the engine has been off). The purge data may also include the time since last purge. The time since last purge may also be maintained within the database.

For example, the climate controller 204 may determine that purging is appropriate in response to vehicle occupants being detected via the seat sensor 210 and/or the interior cabin temperature exceeding a threshold temperature. Further, the climate controller 204 may verify that the battery has sufficient power to facilitate the purge. Thus, the climate controller 204 may determine whether the state of charge is above the threshold state of charge. Further, the climate controller 204 may determine whether the time since last purge exceeds a threshold purge time, for example, twenty minutes.

Figure 3:
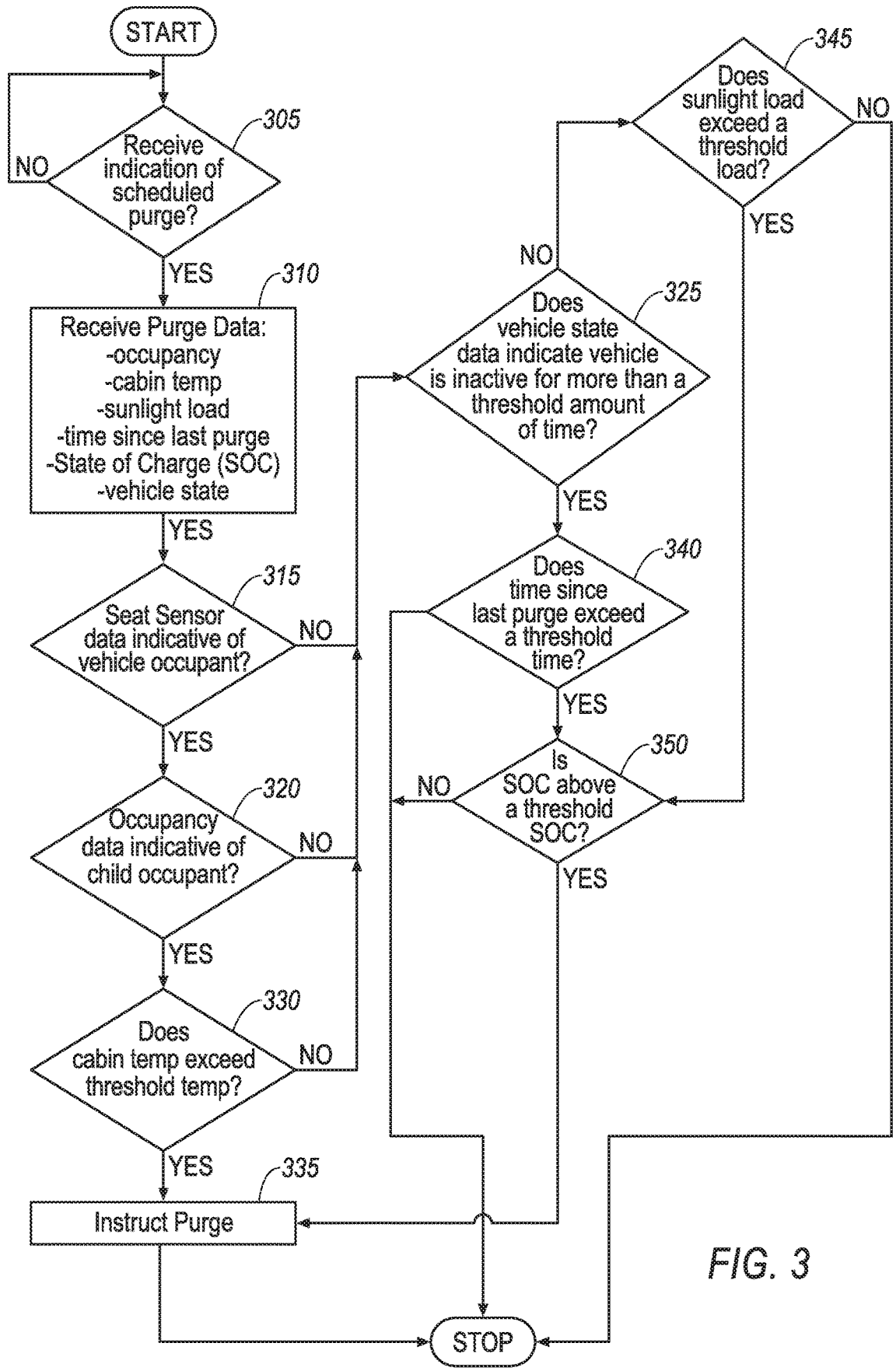
FIG. 3 illustrates an example process for a vehicle ventilating and cooling system.

FIG. 3 illustrates an example process 300 for the vehicle ventilating and cooling system 200. At block 305 the controller 204 may determine whether the controller 204 has received an indication of a scheduled purge. Purges may be schedules or initiated in a number of ways. In one example, a purge may be initiated from a remote mobile device such as a smart phone via AppLink. Once a purge is scheduled, the process 300 proceeds to block 310.

At block 310, the controller 204 receives purge data. As described above, the purge data may include data and signals from various vehicle sensors and components. For example, the purge data may include seat sensor data indicative of vehicle occupancy, interior cabin temperature, exterior cabin temperature, sunlight-load, time since last purge, state of charge (SOC), vehicle state, to name a few.

At block 315, the controller 204 may determine whether the seat sensor data indicates the presence of a vehicle occupant. This may include the data indicating a weight on a seat of over a threshold. If so, the process 300 proceeds to block 330. If not, the process 300 proceeds to block 325.

At block 330, the controller 204 determines whether the interior cabin temperature exceeds the interior temperature threshold. For example, the interior temperature threshold may be approximately 85 degrees. If so, the process 300 proceeds to block 335. If not, the process 300 proceeds to block 325.

At block 335, the controller 204 instructs the components 202 to perform the purge.

At block 325, the controller 204 may determine whether the vehicle state indicates whether the vehicle engine has been off (i.e., inactive) for more than a threshold time. For example, the threshold time may be approximately one hour. If so, the process 300 proceeds to block 340. If not, the process 300 proceeds to block 345.

At block 340, the controller may determine whether the time since last purge exceeds a threshold purge time. For example, the threshold purge time may be approximately 20 minutes. If the threshold purge time has been exceeded, the process 300 proceeds to block 350. If not, the process ends.

At block 350, the controller 204 determines whether the state of charge is above a threshold stated of charge such as 20%, for example. If so, the process 300 proceeds to block 335 where the controller 204 instructs the components 202 to perform the purge. If not, the process 300 ends.

At block 345, the controller 204 determines whether the sun-load exceeds a sun-load threshold. In one example, the sun-load may be a voltage signal provided to the controller 204. The controller 204 may determine whether the voltage signal includes a voltage exceeding the sun-load threshold. In one example, the sun-load threshold may be approximately 4 volts. If so, the process 300 proceeds to block 350. If not, the process 300 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine-off vehicle ventilating system, comprising:
at least one sun-load sensor arranged within the vehicle,
a controller configured to
receive a sun-load signal indicating a sun-load level from the sensor,
receive a vehicle engine status,
receive occupant sensing data indicative of at least one vehicle occupant,
receive a state of charge (SOC) of a vehicle battery, and
instruct at least one ventilating component to conduct a purge of vehicle cabin air in response to the vehicle engine status indicating that the vehicle has been off for a threshold amount of time, the sun-load level exceeding a sun-load threshold, and the SOC exceeding a SOC threshold, wherein the sun-load signal includes a voltage and the sun-load threshold is approximately 4 volts.

2. The system of claim 1, further comprising at least one seat sensor arranged within a seat of a vehicle and configured to transmit the occupant sensing data indicative of the presence of an occupant in the vehicle to the controller.

3. The system of claim 2, wherein the controller is further programmed to determine whether occupant sensing data indicates a vehicle occupant in response to the occupant sensing data including a pressure exceeding a predefined weight threshold.

4. The system of claim 1, wherein the controller receives the vehicle engine status from at least one vehicle electronic control module.

5. The system of claim 4, wherein the controller is further programmed to instruct the component to purge the vehicle cabin air in response to the vehicle being inactive for at least the threshold amount of time.

6. A method, comprising:
receiving occupant sensing data indicative of at least one vehicle occupant,
receiving a vehicle engine status,
receiving a sun-load level from a sun-load sensor,
receiving a state of charge (SOC) of a vehicle battery, and
instructing at least one ventilating component to purge the vehicle cabin air in response to the vehicle engine status indicating that the vehicle engine has been off for a threshold amount of time, the sun-load level exceeding a sun-load threshold, and the SOC exceeding a SOC threshold, wherein the sun-load level includes a voltage and the sun-load threshold is approximately 4 volts.

7. The method of claim 6, further comprising receiving a time since last purge instructing the ventilating component to purge the vehicle air in response to the time since last purge exceeding a purge threshold time.

8. A vehicle cooling system, comprising:
at least one seat sensor arranged within the vehicle for detecting an item on a vehicle seat,
at least one battery having a state of charge (SOC);
at least one sun-load sensor arranged within the vehicle and configured to produce a sun-load signal;
a controller configured to
receive seat sensor data indicating occupancy of the vehicle from the sensor,
receive the sun-load signal from the sun-load sensor,
receive vehicle engine status from at least one vehicle electronic control module,
receive the SOC of the battery, and
instruct at least one cooling component to conduct a purge of the vehicle cabin air in response to the engine status indicating that the vehicle engine has been off for a threshold amount of time, the sung-load level exceeding a sun-load threshold, the SOC exceeding an SOC threshold, and the seat sensor indicating occupancy of the vehicle.

* * * * *